250/201

Oct. 1, 1968 K. V. DIPROSE 3,404,280

METHOD AND APPARATUS FOR FOLLOWING AN OUTLINE ON A SUBSTRATE

Filed Oct. 29, 1964 5 Sheets-Sheet 1

Inventor
KENNETH V. DIPROSE
By Imirie & Smiley
Attorneys

Inventor
KENNETH V. DIPROSE
By Imirie & Smiley
Attorneys

Inventor
KENNETH V. DIPROSE
By [signature]
Attorneys

Inventor
KENNETH V. DIPROSE
By Imrie & Smiley
Attorneys

Inventor
KENNETH V. DiPROSE
By Imirie & Smiley
Attorneys

United States Patent Office 3,404,280
Patented Oct. 1, 1968

3,404,280
METHOD AND APPARATUS FOR FOLLOWING AN OUTLINE ON A SUBSTRATE

Kenneth V. Diprose, Westbury-on-Trym, Bristol, England, assignor to Hancock & Co. (Engineers) Limited, Croydon, Surrey, England, a British company
Filed Oct. 29, 1964, Ser. No. 407,395
20 Claims. (Cl. 250—202)

ABSTRACT OF THE DISCLOSURE

Method and apparatus for following an outline on a substrate, in which a series of consecutive spots of light is formed on one side of the outline, each spot crossing the outline at an oblique angle and being extinguished on the other side, thereby producing a scanning pattern which is asymmetrical with respect to the outline to compensate for the asymmetrical placing with respect to the outline of a tool whose movements are controlled by the outline.

This invention relates to line following devices, and more particularly to a photoelectric line following device which is very suitable for use in conjunction with an oxygen jet cutting machine, but is not limited to that application.

Line following devices as hereinafter discussed contain photoelectric apparatus and are adapted to follow an outline formed on a substrate, for example, an outline drawn on paper, the movement of the photoelectric device in following the outline being used to control a tool in a machine in such a way that the tool reproduces the shape, or the magnified shape, of the outline on a workpiece. While the device according to the invention will be described in its application to oxygen jet flame cutting machines it will be evident that it may also be applied to machines using ordinary cold cutting tools and for other purposes.

In the case of the oxygen jet cutting machine the outline represents the shape of a piece which is to be cut, for example from steel plate, and the outline on its substrate is laid on a tracing table on the cutting machine. A motor or two motors are started up to enable the line follower to move in the appropriate directions in a horizontal plane to follow the outline and at the same time the tool, in this case the oxygen jet cutter which is located over the plate to be cut, moves in all directions with the follower. The photoelectric follower or tracing head above the tracing table generates electrical signals which influence an additional steering motor and cause the follower to be rotated about a vertical axis, so that it always follows the outline. The signals generated by the follower are also applied to the control of the aforementioned one or two motors, according to the type of system employed, in such a manner that the cutter traverses a path with respect to the workpiece which corresponds to the shape of the outline.

In one system, referred to as a steering system, a single motor drives a wheel rotatable about a horizontal axis which is steerable (that is, rotatable about a vertical axis) in synchronism with the rotation of the follower. The wheel has a serrated periphery which engages a part of the table, so that the direction in which the follower moves at any instant depends upon the steered position of the driving wheel. In this way the follower is moved in such a way as to keep the outline immediately below the follower and the signals delivered by the tracing head in following the divergences and curves of the outline are transmitted to the steering motor, which steers the follower so as to keep the outline below the follower and simultaneously steers the driving wheel. Since the oxygen jet cutter is being moved over the work in exactly the same way it cuts the piece of plate to the shape of the outline.

In the system employing two motors to drive the table, the steering motor steers the follower head as in the other system, but in place of the steerable driving wheel a device, such as a sine/cosine potentiometer or synchro resolver, is used from which two signals are derived, the signals corresponding to the components of the movement of the follower head in two directions which are mutually at right angles, the signals being used respectively to control the two motors, each of which is adapted to drive an upper carriage forwards or backwards along one of two lines, the two lines being mutually at right angles, the magnitude of the signals being such that the motors are driven at different speeds and/or in different directions, so as to produce a compound movement of the upper carriage in any direction, which is precisely the same as the movement of the follower. This system is referred to as the co-ordinate drive system.

Many difficulties are encountered in devising a photoelectric following device which is capable of following the outline exactly, and the known types of follower are either inaccurate to an objectionable degree, or excessively complicated and expensive if the inaccuracies are to be kept within acceptable limits.

Scanning is carried out in various ways, which are known to those skilled in the art. In one method an area around the portion of the outline being followed is brightly illuminated and an image of this area, including an image of the portion of the outline, is projected upwardly and a photoelectric device carried on a movable arm is vibrated across this image, the photoelectric device seeing a tiny spot of the illuminated area at any instant. If the image of the outline is in the centre of the scanning path the signal produced by the photoelectric device is equal during the excursions on opposite sides of the outline. If, on the other hand, the outline deviates from the instantaneous path of the follower, so that it is no longer in the centre of the scanning path, the signal produced by the photoelectric device during its excursion on one side of the outline increases in magnitude, while the signal produced during the excursion on the other side of the outline has a reduced magnitude. This difference is used to control a steering motor which rotates the line follower about its own axis so that the scanning path is always at right angles to, and centrally placed with respect to, the portion of the outline being scanned, and the steering movement is also transmitted either mechanically to the steering wheel which drives the carriage bearing the follower, in the case of a steering system, or to a sine/cosine potentiometer or synchro resolver, which controls the driving power applied to the two motors in a co-ordinate system.

Numerous variations on this theme have been proposed and used. For example, instead of vibrating the photoelectric device across the image of the outline a small spot of light may be caused to vibrate across the outline, there being two photoelectric devices, one on each side of the outline, which respond respectively to the illumination of the two sides of the outline, the output of the photoelectric devices being equal when the outline is in the centre of the scanning path, the signal from one photoelectric device being increased while that from the other is decreased if the outline deviates from the central position. In all these methods it is usual to vibrate the movable member at mains frequency, i.e., at 50 or 60 c./s.

In a third known method the vibrating member is dispensed with and two lamps are placed respectively on the two sides of the outline and the light from the lamps is modulated, for example, by feeding them respectively through oppositely poled half-wave rectifiers from the mains alternating current supply. If the filaments of the lamps have a sufficiently low thermal inertia then the portions of the substrate on the two sides of the outline are alternately brightly illuminated as the filaments of the lamps alternately become brighter and duller. Two photoelectric devices are employed, placed on opposite sides of the outline, and if the outline is in the centre of the instantaneous path of the follower the two photoelectric devices again produce equal signals but the signals vary if deviation occurs.

In the three known types of scanning device described above, the illumination on the two sides of the line is compared, and the machine is steered or the co-ordinate motors are energized according to the difference between the illumination. In two of the three cases scanning is carried out by vibrating either a single spot of light or a photoelectric cell which sees a spot of the image across the outline in a direction which is normal to the outline, and in the third case the illumination on the two sides of the outline is alternately varied. Where a member is vibrated, the vibration is a simple harmonic motion so that the spot of light, or the spot of the image seen by the photoelectric device, moves at a varying speed across the field being scanned, with the outline at its centre. In all cases the vibration, or the rate of variation of the illumination, is at power supply frequency.

An important object of the present invention is to provide an improved scanning device for a photoelectric follower, and a novel manner of using the signals from the scanning device to control a steering motor, in order to improve the accuracy of following.

Another object is to provide an improved scanning device for a photoelectric follower which may be applied either to a steering drive system or to a co-ordinate drive system.

A further object is to provide a scanning device in which a series of separate spots is produced, each starting from one side of the outline and traversing across it at a substantially constant speed and then being extinguished. This provides specific advantages which will appear later.

Still another object is to provide an outline scanning system in which the difference in time between a generated timing signal and the instant at which the spot crosses the outline when the outline deviates is used to produce the control signal, in contrast to the older systems in which the difference in illumination on the two sides of the outline is used.

Still a further object is to provide a scanning device employing an asymmetrical scanning pattern, by arranging that the spots, instead of crossing the outline substantially at right angles thereto, cross the outline at an oblique angle. By this means it is possible to allow for the finite length of the tool (i.e. the diameter of the oxygen jet flame in the case of an oxygen jet cutting machine) so that asymmetrical errors in following, to be described later, are avoided.

Yet another object is to provide that, by the use of a multi-sector rotating disc or mirror, a much higher scanning frequency than the electric mains frequency is obtained, without using high rotational or vibrational speeds in the follower. Consequently the speed of response of the line follower is substantially increased, as compared with known types of follower.

Yet a further object of the invention is to provide a line follower in which a sample-and-hold technique is employed to convert the impulse signals produced by the scanning device into direct current signals with a minimum delay for operating a steering motor.

An additional object in one form of the invention is to provide for the use of spot overlap to obtain a timing impulse. By spot overlap is meant an arrangement by which a new spot is formed just before the preceding spot is extinguished, so that there is a momentary increase in the illumination of the area of the substrate around the portion of the image being followed, and the impulse signal produced by the spot overlap momentarily increased illumination is used as a timing signal.

A further additional object is to provide a scanning system in which the overlap between rotating slots and a stationary head is employed to provide an asymmetric scanning pattern.

As broadly claimed the invention consists of a method of following an outline on a substrate comprising projecting a beam of light on to the substrate through a mask, causing a plurality of shaped apertures to move with respect to the beam and mask to produce a series of consecutive spots of light each of which strikes the substrate on one side of the outline and travels across the outline to the other side thereof and is then extinguished, generating timing signals consisting of timing impulses at a frequency equal to the frequency of spot generation, generating an outline impulse by photoelectric means as each spot crosses the outline, and using a variation in the time difference between each outline impulse and the preceding and following timing impulses to generate a steering signal for the follower to cause the follower to follow the outline.

It is desirable that the spots of light are caused to cross the outline at an oblique angle to produce an asymmetric scanning pattern in order to compensate for an asymmetric positioning of a tool with respect to the outline.

Preferably the series of consecutive light spots is produced by rotating a slotted disc in front of the beam and mask. The mask may consist of a slot in a fixed member.

The timing signals may be produced by photoelectric means co-operating with marks on, or holes in, the rotating disc, or they may be produced by arranging that each new spot is generated just before the preceding spot is extinguished, the momentary existence of two spots resulting in increased illumination of the substrate, the timing impulses being generated from the momentary increase in illumination.

In one form of the invention a sample-and-hold technique is employed to convert the outline and timing impulses produced by the scanning device into direct current signals with a minimum of delay.

The invention includes apparatus to carry out the methods outlined above.

Further objects, and the particular advantages of the invention, will become apparent from a study of the subjoined description of various embodiments of the invention, given by way of example, with reference to the accompanying drawings.

Figure 29:
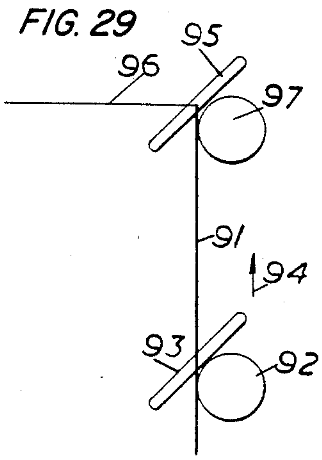
Figure 30:
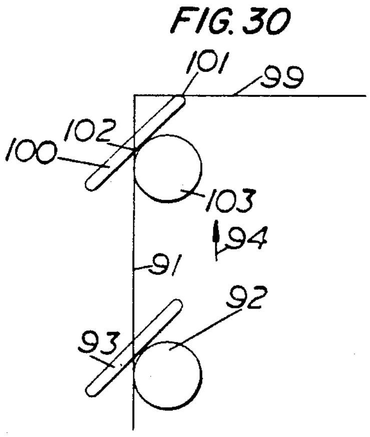
Figure 31:
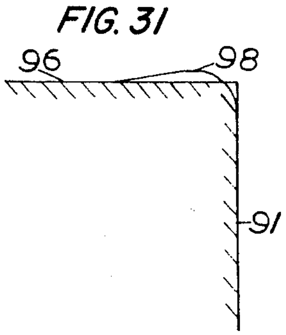
Figure 32:
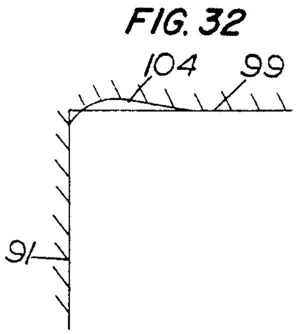
Figure 24:
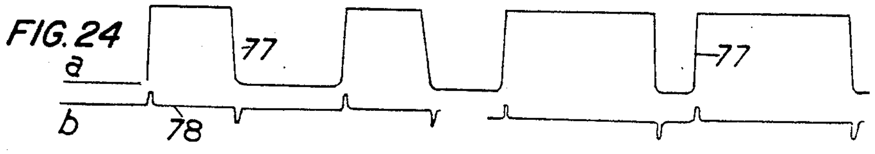
Figures 25, 26, 27:
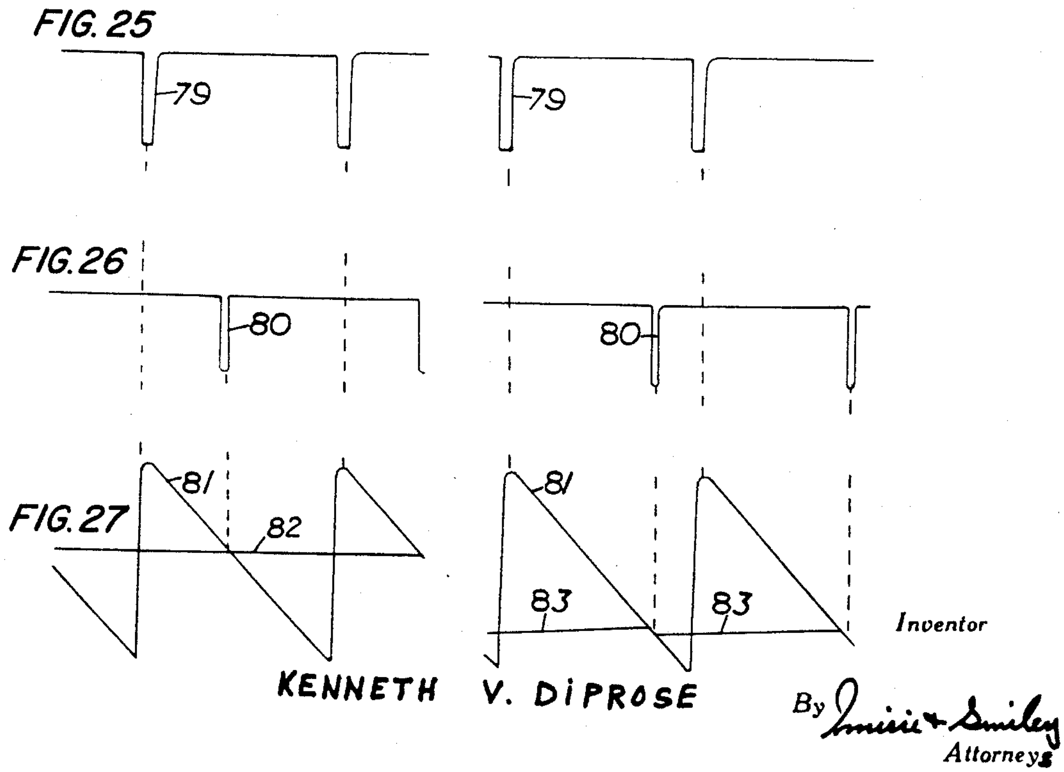
Figure 28:
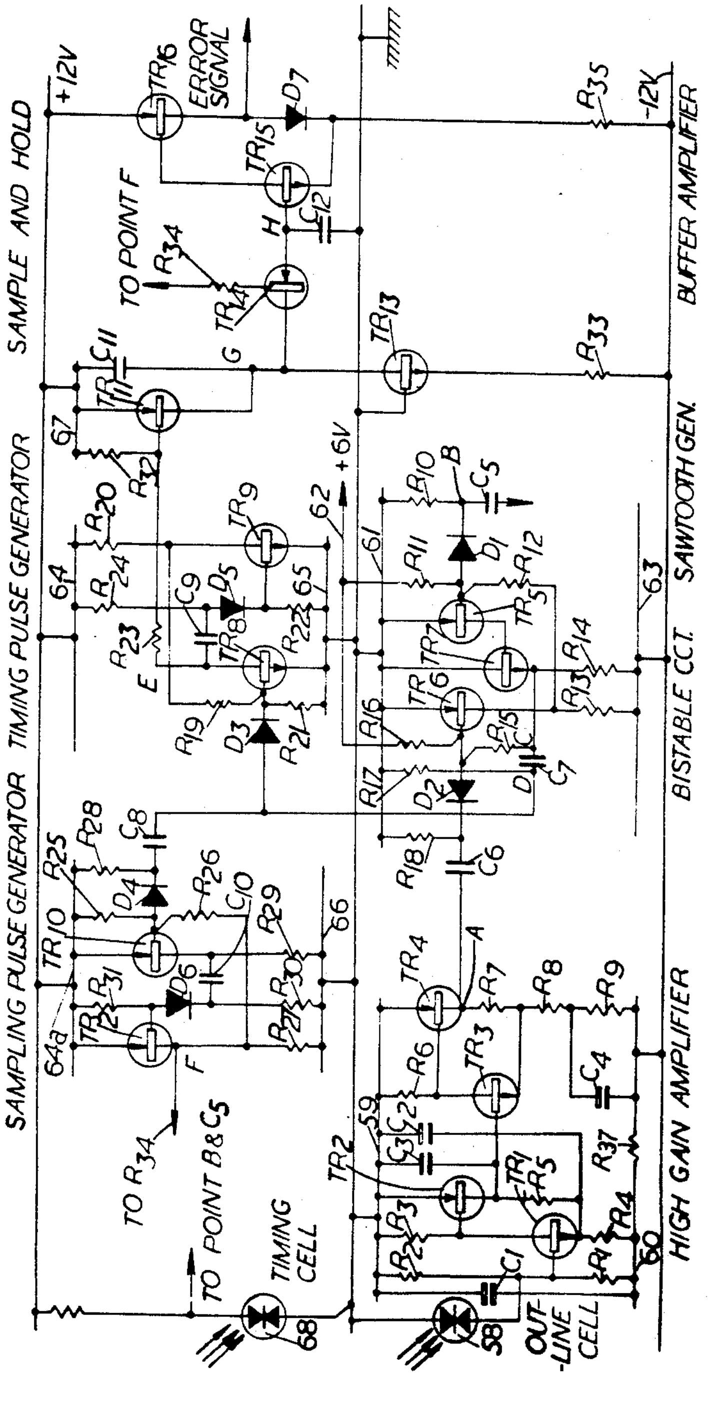

Curve *a* of FIGURE 24 shows the output for zero and large deviations of the outline of a bistable circuit to which the timing and outline impulses are fed, and curve *b* of FIGURE 24 shows the said output after differentiation for zero and large deviations of the outline:

FIGURE 25 shows the output of a timing impulse generator for zero and large deviations of the outline;

FIGURE 26 shows the output of a sampling pulse generator for zero and large deviations of the outline;

FIGURE 27 shows the sampling pulse generator output applied to sample a saw-tooth waveform in order to obtain a "hold" potential for zero and large deviations of the outline;

FIGURE 28 is a circuit diagram of the electronic apparatus to produce the waveforms shown in FIGURES 22 to 27;

FIGURE 29 shows how a follower having an asymmetric scanning pattern will turn an outside corner;

FIGURE 30 shows the shape of the outside corner which is actually cut in the workpiece;

FIGURE 31 shows how a follower having an asymmetric scanning pattern will turn an inside corner; and FIGURE 32 shows the shape of the inside corner which is actually cut in the workpiece.

Before proceeding to the description of the invention, problems arising in connection with photoelectric line followers will be briefly discussed with reference to FIGURES 1 to 18.

Figures 1, 2:
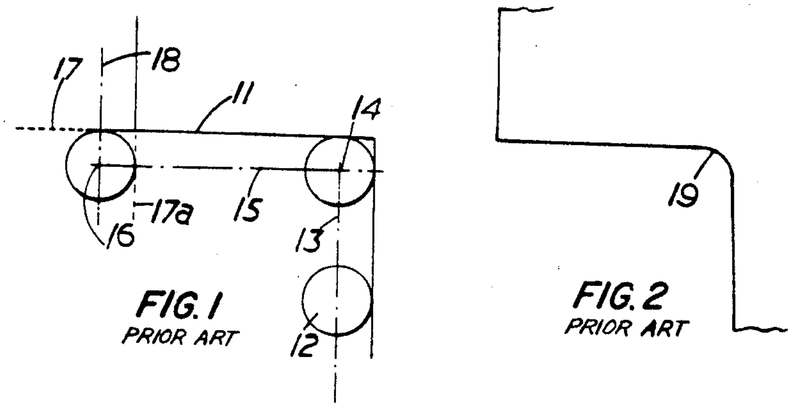
FIG. 1 PRIOR ART, FIG. 2 PRIOR ART
FIGURE 1 shows an outline to which a workpiece is to be shaped and the manner in which a tool may be made to follow the outline by hand.
FIGURE 2 shows the shape produced by the process of FIGURE 1.

In FIGURE 1 a workpiece is to be shaped to the line 11 and the tool is represented by a circle 12. The tool can, for example, be a rotating side milling cutter or it can represent the shape of the jet from the cutting burner of an oxygen jet cutting machine. It is shown operating on the left-hand side of the outline. If the shape were being cut in a machine steered by hand then the tool 12 would first be moved along the centre line 13 until its axis is at the point 14; it would then be stopped and traversed along the centre line 15, at right angles to the line 13, until it reaches a point 16, the path of the periphery of the tool being indicated by the dotted lines 17 and 17*a*, which are extensions of the horizontal and upper vertical portions of the outline 11. From the point 16 the tool would then be traversed along the centre line 18 to complete the shape. The shape of the workpiece produced will be as shown in FIGURE 2, there being a radius 19 within the inside or re-entrant corner, this being the radius corresponding to the circle 12. It is an easy matter to remove the small amount of metal left at 19 in order to produce the sharp corner which is shown in the outline 11.

Where a photoelectric line follower is used it is usual to provide a scanning apparatus which continuously scans, crosswise, the outline to be followed. In FIGURES 3 to 6 the first portion of the outline 11 is shown containing the left-hand corner, and the crosswise scanning of the line is represented by the scanning path 20, the tool being represented by the circle 12, as before. It will be understood that FIGURE 3 and later figures are composite drawings showing the outline and the scanning path and also showing the path of the tool, which is normally at a distance from the scanning path, above the workpiece and not above the outline.

Figures 3, 4, 5, 6:
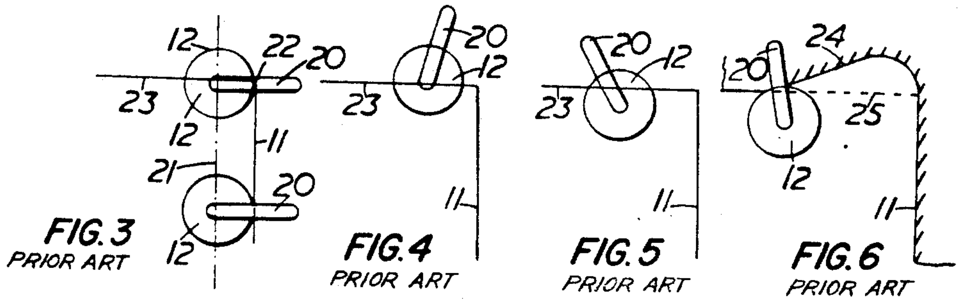
FIG. 3 PRIOR ART, FIG. 4 PRIOR ART, FIG. 5 PRIOR ART, FIG. 6 PRIOR ART
FIGURES 3 to 6 show in stages the shape produced by a prior art automatic line follower having no lead, when turning an inside corner.

Referring now to FIGURE 3, the tool 12 is advanced along the path 21 and it continues at a constant speed along this path until the scanning path reaches the sharp corner 22 in the outline, when the servo system responds violently and attempts to steer the head at maximum speed. By the time the steering signal is generated it will be obvious that the tool 12 has already penetrated beyond the portion 23 of the outline. The further movement of the tool 12 is shown in stages in FIGURES 4 and 5 as it attempts to get round the corner quickly, while FIGURE 6 shows the situation when the tracing head has almost recovered its correct position. It will be clear that with the system shown the tool, upon reaching the corner, is bound to overshoot since it has already penetrated too far before a steering signal is produced and the further movement of the tool while the steering operation is in progress produces the form 24 at the corner instead of the intended form 25, which is shown dotted.

Figures 7, 8, 9, 10:
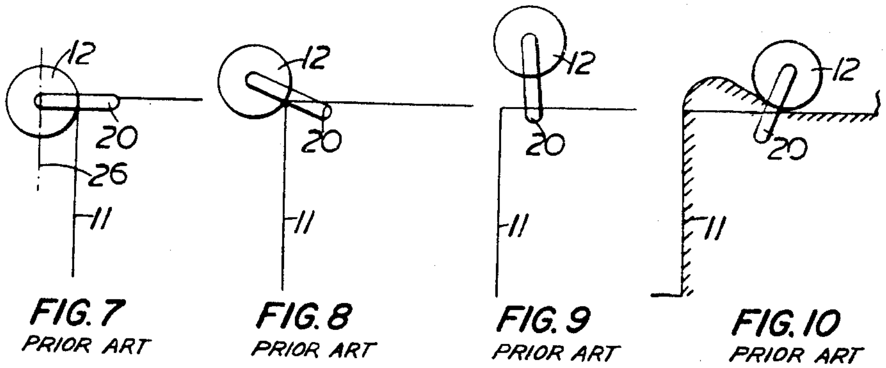
FIG. 7 PRIOR ART, FIG. 8 PRIOR ART, FIG. 9 PRIOR ART, FIG. 10 PRIOR ART
FIGURES 7 to 10 show in stages the shape produced by a prior art automatic line follower having no lead when turning an outside corner.

If the same follower reaches a right-hand corner the effect is as shown in FIGURES 7 to 10, with the tool moving along the path 26 and approaching the corner. No steering signal is delivered until it reaches the upper position shown in FIGURE 7 when a volent right-hand turn signal is delivered. Since the tool is moving at constant speed with respect to the work it again overshoots, as shown in FIGURE 8 in which the deviation of the outline has almost taken it out of the scanning path. The further progress of the tool with respect to the outline is shown in FIGURE 9 while the final stage in negotiating the corner is shown in FIGURE 10. In this case the tool has left a piece projecting at the corner and, while this could later be removed, it represents an objectionable fault in the work.

Figures 11, 12, 13:
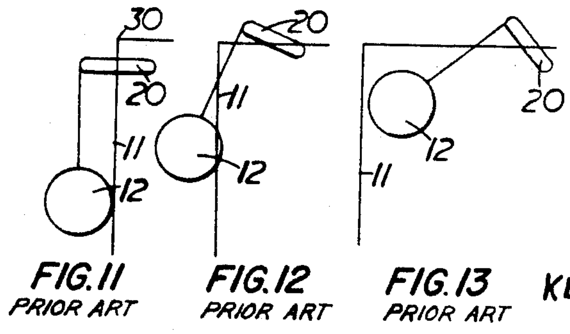
FIG. 11 PRIOR ART, FIG. 12 PRIOR ART, FIG. 13 PRIOR ART
FIGURES 11 to 14 show in stages the shape produced by a prior art automatic line follower having a lead when turning an outside corner.
Figure 14:
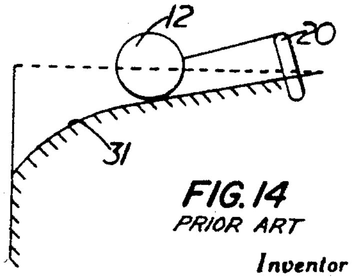
FIG. 14 PRIOR ART
Figure 15:
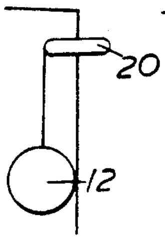
FIG. 15 PRIOR ART
FIGURES 15 to 18 show in stages the shape produced by a prior art automatic line follower having a lead when turning an inside corner.

In order to avoid these faults in following, it is usual to give a lead to the photoelectric tracer, that is to say, the scanning path is slightly in front of the axis of the tracing head. The tool is, of course, offset to one side of the outline, as previously described. The introduction of the lead produces a new fault which is shown in FIGURES 11 to 14, in the case of a left-hand corner. The scanning path 20 is now ahead of the cutting tool axis and when the corner 30 is reached a steering signal is delivered, as before, and as shown in FIGURE 11. This causes the tracing head to begin its steering operation, as shown in FIGURE 12. However, due to the lead of the scanning path the tool is carried sideways before it reaches the corner and it begins to cut across the outline. A further stage is shown in FIGURE 13 and a later stage in FIGURE 14 from which it will be evident that the tool has now cut off the corner of the workpiece and produced the shape 31 instead of the intended shape at the corner.

The turning of a right-hand corner by a follower with a lead is illustrated by four similar diagrams in FIGURES 15 to 18 from which it will be seen that, in this case, the tool leaves material in the corner which should be cut away. It is possible to remove this surplus material after completing the cutting operation but it still represents a fault in cutting.

It is possible to produce something which approximates to a combination of FIGURES 3 to 6 and 11 to 14 on a left-hand corner and which approximates to a combination of FIGURES 7 to 10 and 15 to 18 on a right-hand corner, since without a lead the device tends to produce one set of effects and with a lead it produces the opposite set of effects. The approximate combination may be achieved by giving the scanning path a very small lead with respect to the tool. However, this does not provide a solution to the problem for the following reason.

As was previously noted, with no lead the tracing head must produce a violent steering signal when a corner is reached and the servo must respond very quickly. This implies very high amplification in the servo loop and unless the servo mechanism is extremely powerful and extremely complex this results in instablity. This instability also manifests itself when following straight lines or very gradual curves with the result that the servo mechanism hunts and produces a wavy line or a modulated curve instead of a straight line and a smooth curve. In order to produce a mechanism which is reasonably simple and reliable in operation, the amount of lead which must be allowed is such that the effects shown in FIGURES 11 to 14 and FIGURES 15 to 18 are produced.

In FIGURES 1 to 18 the tool is shown operating on the left-hand side of the outline. It will be understood that if the tool is operating on the right-hand side of the outline the same types of error occur, but in the reversed sense.

As previously noted, the scanning frequency is normally the power supply frequency, that is to say, 50 c./s. or 60 c./s. and the minimum response time is a half-cycle, or 10 milliseconds in the case of a 50 cycle supply. This indicates that a higher frequency would provide a quicker response by the servo without increasing the amplification in the servo loop simply by reducing the delay in responding. This is one feature of the invention which will now be described.

Figure 19:
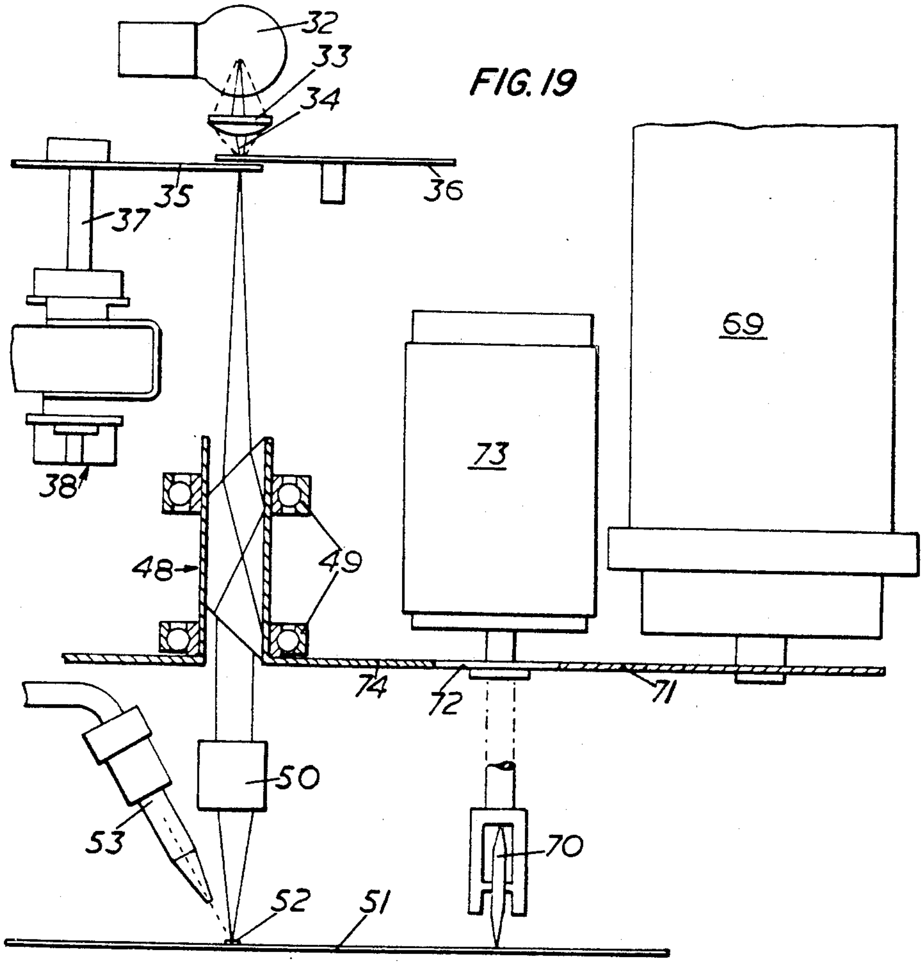
FIGURE 19 is a diagramamtic layout of a photoelectric follower including features of the invention.

FIGURE 19 shows an embodiment of the invention diagrammatically, the embodiment comprising a lamp 32 mounted above a condenser lens 33 which provides a beam of light. The beam 34 passes through slots in two discs, respectively 35 and 36, which overlap. The two discs have slots cut on circles concentric with their axes and the slots will be more particularly referred to later. The disc 36 is normally stationary but is conveniently made rotatable by hand so that any one of a plurality of slots of different shape or width may be brought into register with the beam 34. The disc 35 is mounted on the spindle 37 of a motor, generally indicated at 38, so that it rotates. By forming the rotating disc 35 with a number of slots it is possible to produce a high scanning frequency by simple means. As will appear hereafter, it is not necessary for the system according to the invention to control the speed of the motor 38 very accurately and since the disc 35 presents no appreciable load a simple and cheap type of motor, such as a shaded pole motor, may be used.

Suitable scanning frequencies according to the invention lie between 500 and 1000 c./s. but it will be understood that the invention is not intended to be limited to this particular range. Assuming that the motor spindle 37 and the disc 35 rotate at 1500 r.p.m. then, to produce a scanning frequency of 1000 c./s., the disc 35 is formed with 40 slots equally spaced from each other and disposed in a ring which is concentric with the axis of the disc.

Figure 20:
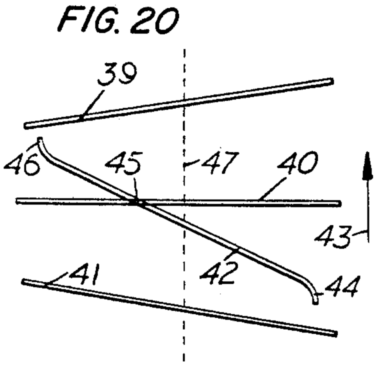
FIGURE 20 shows one form of the slots for producing a scanning beam according to the invention

FIGURE 20 shows how the slots in the two discs are arranged. Three slots 39, 40 and 41 are shown and are a part of a ring of slots formed in the rotating disc 35. In a conveniently sized practical embodiment the slots 39, 40 and 41 lie on a pitch circle of about 2½" diameter and each slot is about 0.15" long by 0.005" wide. The slot 42 is a stationary slot formed in the disc 36. If the disc 35 is rotating in the direction of the arrow 43 and a beam of light from the condenser 34 covers the whole area of the slots, then it will be clear that as the slot 41 reaches the point at which it overlaps the end 44 of the slot 42 a small point of light from the beam will be projected downwardly, and as the slot 41 continues to move upwardly on the drawing the position of the point of light will move to the left, until it reaches the point 45 at which the slot 40 is shown overlapping the slot 42, the shape of the spot of light then being as indicated at 45. With continued rotation of the disc the spot of light proceeds to the end 46 of the slot 42. In operation the outline being traced will lie on the dotted line 47.

A consideration of FIGURE 20 will show that as the disc 35 rotates a spot of light is repeatedly formed at the point 44 and then travels to the left in the drawing, following the path of the slot 42, until it reaches the point 46, when it is extinguished, to be followed by another spot starting at the point 44. Thus a path is scanned across the outline 47 but whereas in the case of the known types of follower the scanning path lies at right angles to the outline this is not the case in the present invention. It will be evident that a scanning path which is at right angles can easily be formed by making the slot 42 into a straight slot and slewing the slots 39, 40 and 41 with respect to the centre of rotation of the disc 35. The reason for the particular shape of the slot 42 shown is that the tool is not symmetrically placed with respect to the outline but is on one side of it and, as previously described, so that the turning of left-hand and right-hand corners produces different effects. While the invention does not completely cure those particular faults in the systems it is possible to compensate them to a large extent. As may be seen by comparing FIGURE 3 to 6 with FIGURES 7 to 10 or FIGURES 11 to 14 with FIGURES 15 to 18 the tool, in negotiating a right-hand corner, follows a longer path than it does in negotiating a left-hand corner. In other words, assuming right-angled turns in each case, since the tool goes round the inside of the left-hand corner and round the outside of the right-hand corner, a more rapid steering action is required when turning to the left than when turning to the right. This is catered for in the arrangement shown in FIGURE 20 since the part of the scanning line which would first meet a left-hand corner (that part emanating from the end 46 of the slot 42) is effectively given a lead, or a greater lead, with respect to the centre portion of the line slot which would first meet a right-hand corner. Assuming a stable servo system with a given response time it will be evident that by effectively giving the scanning line a greater lead with respect to a left-hand corner than with respect to a right-hand corner, the asymmetry in operation is at least partly compensated for. This is, of course, only correct when the tool is on the left of the left-hand side of the line. If the tool is operating on the other side of the line, then the disc 36 would be turned to bring a differently formed fixed slot into operative position.

A little consideration will show that the shape of the spot will change as it moves from one end of the slot 42 to the other. The actual shape is quite unimportant since it is the area of illumination which is important, so that the same amount of light falls on to the substrate carrying the outline along the whole length of the scanning path. Since the slot 42 is curved and the slots 39, 40 and 41, although straight and parallel, are moving in a curved path, the area of the spot may change along the length of the slot 42 and this may be compensated if desired by making the width of the slot 42, or the width of the slots 39, 40 and 41, vary along their length.

If it is desired to produce a spot which moves at a uniform speed along the scanning path then this may be provided for by appropriately shaping the slots 39, 40 and 41 or the slot 42.

In most known types of tracing head the whole head is made rotatable in bearings about a vertical axis so that the scanning path is always correctly set with respect to the direction in which the tracing head is instantly being carried over the tracing table. In the present construction an alternative method of steering is used depending upon the rotation of a Dove prism, generally indicated at 48, mounted in bearings 49, which is driven by the steering motor. The point of light moving along the scanning path is projected downwardly on to the Dove prism 48 and, having passed through the prism, it is focused by an objective lens 50 on to the substrate 51 which carries the outline shown as a heavy mark at 52. The scanning line is seen by a photoelectric device 53 which is conveniently a photo-transistor. It will be understood that two devices 53 could be used on opposite sides of the scanning path to look at the respective sides of it. However, the invention includes a novel method of obtaining a steering signal which requires only one photoelectric device.

In this method, instead of producing an output signal which is dependent upon either the illuminated area or the amount of light seen on the respective sides of the line, the output signal depends upon the time taken for each scanning point or spot to travel from the beginning of the scanning path to the outline, compared with the time taken for the scanning spot to travel from the outline to the end of the scanning path. For this purpose a timing impulse is first produced, and one method of producing it is shown in FIGURE 21.

Figure 21:
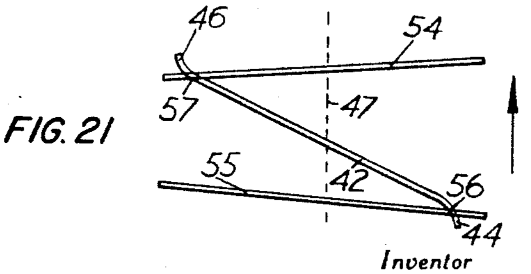
FIGURE 21 shows how two points of light are produced simultaneously by the arrangement of slots according to one aspect of the invention, in order to produce timing impulses in the photoelectric device.

Referring to FIGURE 21 the spacing of the slots 54 and 55 is less than the distance, in the direction of movement of the slots 54 and 55, between the ends of the slot 42. Consequently, one point of light is formed and begins to move from the beginning of the scanning path before the preceding scanning point has reached the end of the scanning path. This is illustrated in FIGURE 21, in which it will be seen that there are two points 56 and 57 existing simultaneously. If a plain white card is placed below the lens 50 and the scanning device is set in motion then during the period when the two points are in existence together the photoelectric device 53 will see twice as much light on the card as during the remaining period, when only one spot is moving acros the length of the scanning path between its ends.

The method described in connection with FIGURE 21 is one way of producing timing impulses. Another way is to form a ring of holes in the rotating disc and place a lamp on one side and a photocell on the other. The number of holes in the ring is, of course, equal to the number of slots in the disc.

FIGURES 22 to 27 show the waveforms produced in various stages of generating the signal which is used to control the steering motor, while one form of the circuitry which may be used for the electronic apparatus to produce these waveforms is shown in FIGURE 28. These figures will all be described together.

Each of the FIGURES 22 to 27 shows two waveforms, one, on the left, for the condition of zero error, that is to say, when the outline lies precisely along the line along which the follower is moving and the other for the condition of large error, that is to say, when the outline has deviated to a considerable extent from the line along which the follower is moving.

Figure 22:
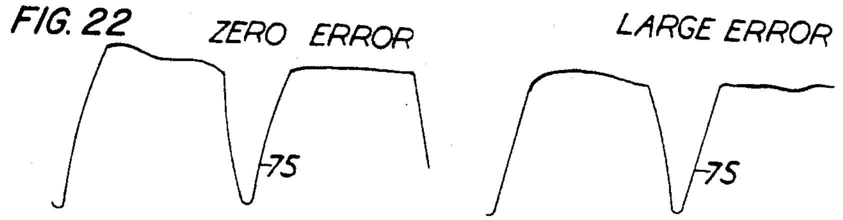
FIGURE 22 shows the timing and outline impulses for zero and large deviations of the outline.

FIGURE 22 shows the identical but time-displaced outline impulses 75 which are produced. In FIGURE 28 the photoelectric cell or cells which pick up the light from the scanning point are indicated by reference 58.

A by-pass capacitor C1 is connected between a ground line 59 and a negative supply line 60 fed via R37 from a common negative line and held at −12 volts. The signal from the photocell or cells 58 is applied to the base of a transistor TR1 which, in conjunction with a further transistor TR2, forms a directly coupled complementary pair. A resistor R1 is connected between the base of TR1 and the negative line 60 and a further resistor R2 is connected between the base of TR1 and the ground line 59, the resistors R1 and R2 providing the correct bias for TR1. The emitter of TR1 is connected through a resistor R4 to the line 60 and the collector of TR1 is connected to the base of TR2, and through a resistor R3 to the ground line 59. The emitter of TR2 is connected to the ground line 59 and the collector of this transistor is connected through a resistor R5 to the emitter of TR1 and directly to the base of a transistor TR3 which, with another transistor TR4, constitutes a further directly coupled complementary pair, the four transistors constituting a high gain amplifier. A capacitor C3 is connected between the collector of TR2 and the ground line 59 and a by-pass capacitor C2 is connected between the emitter of TR1 and the ground line 59. The collector of TR3 is connected to the base of TR4 and through a resistor R6 to the ground line 59. The emitter of TR4 is connected directly to the ground line 59 and the emitter of TR3 is connected to a voltage dividing network consisting of three resistors, R7, R8 and R9, connected in series between the emitter of TR4 and the negative line 60, the emitter of TR3 being connected to the junction of resistors R7 and R8, there being a capacitor C4 connected across the resistor R9. The output of this piece of circuitry is taken from the point A, which is the collector of TR4, and the waveform at this point is shown in FIGURE 22.

The timing impulses, provided in any manner described above, are fed from the point B through a diode D1 to the base of a transistor TR5, which is a part of a bistable circuit. A resistor R10 is connected between the point B and a further ground line 61. The base of TR5 is connected through a resistor R11 to a supply line 62 which is connected to a potential of +6 volts with respect to the ground line. The base of TR5 is also connected through a resistor R12 to the collector of a transistor TR6 and through a resistor R13 to a negative supply line 63 also fed from the common negative line.

Figure 16:
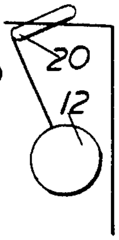
FIG. 16 PRIOR ART
Figure 17:
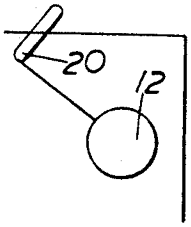
FIG. 17 PRIOR ART
Figure 18:
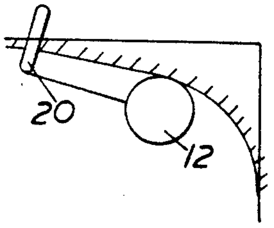
FIG. 18 PRIOR ART
Figure 23:
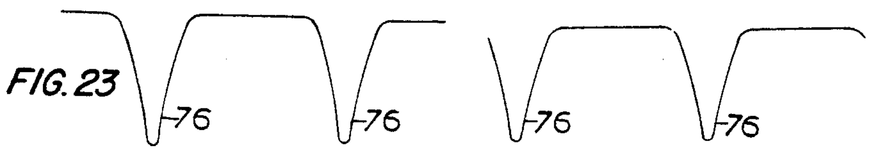
FIGURE 23 shows the timing reference impulses for zero and large deviations of the outline.

The timing signals are derived from a photocell or other device 68 and are delivered through a capacitor C5 to a point B of FIGURE 16, being in the form 76 shown in FIGURE 23.

The emitters of transistors TR5 and TR6 are connected to the ground line 61 while the collector of transistor TR5 is connected to the base of a transistor TR7 having its collector connected to the ground line 61. The two transistors TR5 and TR6 are n-p-n types while the transistor TR7 is a p-n-p type. The emitter of transistor TR7 is connected through a resistor R14 to the line 63 and also through a resistor R15 to the base of TR6. The base of TR6 is coupled through a resistor R16 to the +6 volts supply line 62. The outline impulses from the point A are fed to the base of TR6 through a diode D2 from one terminal of a capacitor C6 whose other terminal is connected to the point A. A resistor R18 is connected between the second terminal of C6 and the ground line 61.

The bistable circuit formed by transistors TR5, TR6 and TR7 is set to one of its states by the outline impulses from point A and to the other of its states by the timing impulses arriving at point B.

From the emitter of TR7 the output is fed through a capacitor C7 which, with a resistor R17, differentiates the signals. The signals are then passed through a diode D3 to the base of a transistor TR8 and through a capacitor C8 in series with a diode D4 to the base of transistor TR10, the diodes D3 and D4 being oppositely poled so that TR8 receives positive impulses and TR10 receives negative impulses.

FIGURE 24 shows the output wave 77 of the bistable circuit taken at point C in FIGURE 28, showing how the bistable circuit is placed in the "on" position by a timing reference impulse 76 applied at point B, and is placed in its "off" position by an outline impulse 75 applied at point A. The output is differentiated by the capacitor C7 and resistor R7 so that the output at the point D is as shown by the wave 78 in FIGURE 24.

The transistor TR8, in conjunction with a further transistor TR9, constitutes a timing impulse generator which receives the positive-going impulses shown in FIGURE 24. The base of TR8 is connected through a resistor R19 to the collector of TR9 and through a resistor R20 to a positive (+12 volts) line 64 fed from a common positive line. The base of TR8 is also connected through a resistor R21 to a ground line 65 and the emitters of TR8 and TR9 are also connected to this ground line. The collector of TR8 is connected through a capacitor C9 in series with a diode D5 to the base of TR9, which latter is also connected through a resistor R22 to the ground line 65. The junction of capacitor C9 and diode D5 is connected through a resistor R24 to the positive line 64. The collector of TR8 is also connected through a resistor R23 to the base of a transistor TR11. The timing impulse generator output appears at the point E, that is, the collector of TR8, and has the form 79 shown in FIGURE 25.

As stated above, the negative differentiated impulses from FIGURE 24 are applied to the transistor TR10 and this, with a further transistor TR12, constitutes a sampling pulse generator which produces the output 80 shown in FIGURE 26. In the sampling pulse generator the base of TR10 is connected through a resistor R25 to a positive (+12 volts) line 65, also fed from the common positive line, and through a resistor R26 to the collector of TR12, which latter is also connected through a resistor R27 to a ground line 66, connected to the common ground line. A resistor R28 is connected between the junction C8 and D4 and the positive line 65.

The emitters of both TR10 and TR12 are connected to the positive line 65.

The collector of TR10 is connected directly to one terminal of a capacitor C10 and through a resistor R29 to the ground line 66. The other terminal of C10 is connected through a resistor R30 to the ground line 66 and through a diode D6 to the base TR12, which base is connected through a resistor R31 to the positive line 65. The output appears at the collector of TR12 (the point F) and its destination will be referred to later.

The output E from transistor TR8 is, as previously stated, applied through resistor R23 to the base of transistor TR11 and is used to trigger a saw-tooth voltage. The emitter of TR11 is connected to a positive (+12 volts) line 67, fed from the common positive line, and the base of transistor TR11 is connected to line 67 through a resistor resistor R32. Saw-tooth voltage 81 (FIGURE 27) is produced by a transistor TR13 whose base is connected to the common ground line and whose emitter is connected through a resistor R33 to the common negative line (−12 volts). The collector of TR13 is connected through a capacitor C11 to positive line 67 and the collector of TR11 is also connected to the collector of TR13 to discharge capacitor C11 across which the saw-tooth voltage is built up. The terminal of C11 which is connected to the collectors of TR11 and TR13 is also connected to the collector of a transistor TR13, whose emitter is connected to one terminal of a capacitor C12 and also the base of a transistor TR15.

In operation, the transistor TR13 produces the saw-tooth voltage shown in FIGURE 27, the timing impulse generator produces the impulses shown in FIGURE 25 and these impulses cause the fly-back of the saw-tooth voltage at regular intervals. The sampling impulse generator produces an output at the point F, as shown in FIGURE 26, and this output is applied through a resistor R34 to the base of transistor TR14. The transistor TR14 is made conductive by this impulse and it samples the voltage existing at the point G, which is the terminal of C11 at which the saw-tooth voltage is built up. As shown in the left-hand part of FIGURE 27 the sampling voltage 82 is about half the total magnitude of the saw-tooth voltage for zero error whereas, as shown in the right-hand part of FIGURE 27, the voltage 83 sampled by TR14 is substantially different when there is a large following error. If, on the other hand, the following error were in the other direction, the voltage sampled in the right-hand part of FIGURE 27, instead of being lower than the voltage shown in the left-hand part of FIGURE 27, would be higher.

The sampling voltage held in capacitor C12 is applied to the transistor TR15, whose emitter is connected through a resistor R35 to the common negative line (−12 volts) and also to one terminal of a diode D7 whose other terminal is connected to the collector of TR16, which has its emitter connected to the positive common line (+12 volts). The collector of TR15 is connected to the base of TR16 and the error signal is taken from the collector of TR16. The error signal is applied to a power amplifier, which provides the power to drive the steering motor.

FIGURES 29 and 30 show respectively how an outside corner is turned, and the shape of the cut after the corner has been completed. The part of the outline being followed is indicated by reference 91 and the shape of the oxygen jet flame is indicated at 92. The path followed by the scanning spots is indicated at 93. It is, of course, to be understood that the outline and the scanning path are in one part of the machine, whereas the oxygen jet flame 92 is, in fact, removed from the outline, but they are all shown on the same diagram to assist explanation. The follower is moving in the direction of the arrow 94 in order to follow the outline and the flame 92 is cutting the workpiece and moving in the same direction. The scanning spots are generated at the upper right-hand end of the scanning path and move downwardly to the lower left-hand end, where they are extinguished. The follower continues to follow the outline until it reaches the position 95 at which the outline 91 turns sharply to the left to the part 96. When it reaches this point, however, the outline-crossing impulse is generated a little later, and this initiates the steering signal which causes the steering motor to be started to execute the left-hand turn. It will be observed that the impulse is thereafter produced by the part 96 of the outline, and as the follower moves forward the steering signal is very rapidly increased, to cause the follower to steer sharply to negotiate the corner. The jet flame follows the follower. The corner produced is shown in FIGURE 30 in which the parts 91 and 96 of the outline are shown for comparison with the line 98 actually produced by the cutter on the workpiece.

For comparison with FIGURES 29 and 30, FIGURE 31 shows the cutting of an inside corner while FIGURE 32 shows the shape produced. In FIGURE 31 the jet flame 92 and the scanning path 93 are shown, the direction of movement being in the direction of the arrow 94 along the portion 91 of the outline precisely as shown in the lower part of FIGURE 29. However, the outline in this case turns a corner to the right to form an outline portion 99. The oblique scanning line 100 first encounters the part 99 of the outline when its forward end 101 crosses that part. As soon as the end 101 has crossed the outline part 99, an outline impulse is produced at the beginning of each scanning line and a second impulse is produced when the spot makes its crossing of the outline portion 91 at the point 102. However, a consideration of the circuitry of FIGURE 28 will show that the first impulse, made by the end 101, will change over the bistable circuit of FIGURE 28 while the second impulse, generated at the point 102, will have no effect, since the bistable circuit cannot be changed in the same direction twice. Since the impulse produced at the point 101 follows immediately after the timing impulse, a steering signal of maximum magnitude is produced and the follower and jet flame are steered round the corner very rapidly. The effect is shown in FIGURE 32 which repeats the parts 91 and 99 of the outline and shows the shape 104 which is actually cut.

From these diagrams it will be clear that by the use of the asymmetrical scanning pattern it is possible to arrange matters so that the errors produced are made substantially the same when cutting either outside or inside corners. Furthermore, by the use of the high frequency of spot generation and circuitry which responds with great rapidity the magnitude of the errors may be reduced to a minimum. In fact, by proper design of the apparatus the cutting errors may be reduced almost to vanishing point.

In FIGURES 19 and 21 means are illustrated for forming a scanning spot and causing it to follow a predetermined path to trace out a desired scanning path or pattern. The length of the path is such that there is an overlap, in terms of time, between the generation of one spot and the extinction of the preceding spot, in order that the momentary increase in total illumination shall produce a timing impulse. However, another favoured means for generating the spots and causing them to traverse a scanning path is to provide a rotatable disc and form a number of holes in it, equally spaced on a circle centered on the disc axis. A sheet metal mask is provided, having an arcuate aperture conforming with the circumference of the said circle and having a selected length corresponding to the length of the desired scanning path. A photocell or photo-transistor is arranged adjacent the aperture so that each spot formed by a part of the beam passing through a hole in the disc first strikes the photocell to produce a timing impulse and immediately passes through the aperture to form a scanning spot. The disc and aperture are so placed that the scanning path crosses the outline at an angle of about 45°. The effect in operation is as shown in FIGURES 29 to 32 except that the scanning path, instead of being a straight line, as shown, is slightly curved. This makes no appreciable difference to the operation of the system.

In the servo system described above the output is derived from a direct current signal which is switched at high speed and therefore has no base time lags. It therefore has a very rapid response and approaches the ideal in a servo system.

I claim:

1. Apparatus for scanning an outline on a substrate comprising a light source and lens system to project a steady beam of light towards a selected area of said substrate bearing a portion of said outline, a mask having an opening through which a part of said beam is passed to said area, rotatable means to interrupt said beam in such a manner that a series of spots of light is formed on one side of said area and each spot is moved across said area at an oblique angle to said outline and extinguished at the other side of said area, and means to derive an outline impulse as each spot crosses said outline, the outline impulses being usable to derive a steering signal for a line follower.

2. Apparatus as claimed in claim 1 in which said rotatable means is a disc co-operating with said mask, said disc being formed with apertures around its axis which co-operate with said opening in said mask to form said series of spots and cause them to move from said one side of said area to said other side.

3. Apparatus as claimed in claim 2 in which said apertures in said disc comprise a series of slots and said opening in said mask is a slot.

4. Apparatus as claimed in claim 3 in which said mask is rotatable and contains a number of slots any one of which may be moved into position to co-operate with said mask.

5. Apparatus as claimed in claim 2 in which said apertures in said disc comprise holes aranged in a circle around said disc, and said mask contains a co-operating arcuate slot.

6. Apparatus as claimed in claim 3 in which said apertures in said disc are so shaped that each new spot is formed just prior to the extinguishment of the preceding spot, comprising photoelectric means exposed to said area, the momentary increase in illumination of said area causing said photoelectric means to generate a timing impulse.

7. Apparatus as claimed in claim 6 in which said photoelectric means also serves to provide an outline impulse each time a spot of light crosses said outline.

8. Apparatus as claimed in claim 7 comprising means to drive said apparatus over said area, a Dove prism to alter the direction of the path of said spots of light in dependence upon the direction of said outline, a steering motor connected to rotate said Dove prism, and means to derive steering signals for said motor from the combination of said timing and outline impulses.

9. Apparatus as claimed in claim 1 comprising means to generate a timing impulse as each spot is formed, said timing impulses and outline impulses being usable to steer said line follower.

10. Apparatus as claimed in claim 9 comprising means to drive said apparatus over said area, a Dove prism to alter the direction of the path of said spots of light in dependence upon the direction of said outline, a steering motor connected to rotate said Dove prism, and means to derive steering signals for said motor from the combination of said timing and outline impulses, means to compare the time interval between a timing impulse and the succeeding outline impulse, with the time interval between the said outline impulse and the succeeding timing impulse, and to derive a steering signal from the difference.

11. Apparatus as claimed in claim 10 comprising means to compare the time interval between a timing impulse and the succeeding outline impulse, with the time interval between the said outline impulse and the succeeding timing impulse, and to derive a steering signal from the difference.

12. Apparatus for scanning an outline on a substrate comprising a light source and lens system to project a beam of light towards a selected area of said substrate, a mask having an opening through which a part of said beam is passed to said substrate, rotatable means to interrupt said beam so as to form a series of consecutive spots of light which move from one side of said area to the other side thereof and are then extinguished, and means to generate a timing impulse as each spot is formed, said timing impulses and outline impulses generated by the crossing of said outline by said spots being usable to steer a line follower, protective means located adjacent said area and responsive to the crossing by the spots of light of said outline to generate outline impulses, means to drive said apparatus over said area, a Dove prism to alter the direction of the path of said spots of light in dependence upon the direction of said outline, a steering motor connected to rotate said Dove prism, and means to derive steering signals for said motor from the combination of said timing and outline impulses.

13. Apparatus as claimed in claim 12 comprising sample-and-hold circuitry to generate said steering signals for said steering motor.

14. Apparatus for scanning an outline on a substrate comprising a light source and lens system to project a beam of light towards a selected area of said substrate, a mask having an opening through which a part of said beam is passed to said substrate, rotatable means to interrupt said beam so as to form a series of consecutive spots of light which move from one side of said area to the other side thereof and are then extinguished, and means to generate a timing impulse as each spot is formed, said timing impulses and outline impulses generated by the crossing of said outline by said spots being usable to steer a line follower, said rotatable means comprising a rotatable disc formed with a series of apertures, said opening in said mask and said apertures in said disc being so shaped that each new spot is formed just prior to the extinguishment of the preceding spot, photoelectric means exposed to said area, the momentary increase in illumination of said area causing said photoelectric means to generate a timing impulse, said photoelectric means also serving to provide an outline impulse each time a spot of light crosses said outline, means to drive said apparatus over said area, a Dove prism to alter the direction of the path of said spots of light in dependence upon the direction of said outline, a steering motor connected to rotate said Dove prism, and means to derive steering signals for said motor from the combination of said timing and outline impulses.

15. Apparatus for following an outline on a substrate comprising a light source and lens system to project a shaped beam of light towards a selected area of said substrate, rotatable means to interrupt said beam so as to form a series of consecutive spots of light which move from one side of said area and cross said outline at an oblique angle to the other side of said area before being extinguished, photoelectric means to generate a timing impulse as each spot of light is formed, a steering motor to steer the apparatus in following said outline, and sample-and-hold circuitry to generate steering signals for said steering motor from the combination of said timing and outline impulses, said sample-and-hold circuitry including a bistable circuit, said timing and outline impulses being applied to the two inputs of said bistable circuit so that each timing impulse sets said bistable circuit to one of its stable states and each next succeeding outline impulse sets said bistable circuit to the other of its stable states, means to differentiate the output of said bistable circuit, a timing impulse generator responsive to the differentiated output of said bistable circuit when said bistable circuit is changed in response to a timing impulse, a sampling impulse generator responsive to the differentiated output of said bistable circuit when said bistable circuit is changed in response to an outline impulse, means to generate a saw-tooth voltage, the fly-back of said saw-tooth voltage being activated by each timing impulse, means activated by each sampling impulse to sample the instantaneous magnitude of said saw-tooth voltage at the instant of the sampling impulse, means to hold the instantaneous sampled voltage, and means to generate an error signal for application to said steering motor dependent upon the sampled voltage being held.

16. A method of following an outline on a substrate comprising forming a series of consecutive spots of light of constant and uniform intensity, causing each spot to strike said substrate on one side of said outline and to travel across said outline to the other side thereof before being extinguished, and arranging the direction of travel of said spots to be at an oblique angle to said outline to produce a scanning pattern which is asymmetrical with respect to said outline in order to compensate for the asymmetrical positioning with respect to said outline of a tool which is being caused to execute movements in accordance with said outline.

17. In a system for cutting a workpiece, in combination, means forming an outline which may have inside and outside corners, a support for movement along the direction of the patch generally defined by said outline, means for moving said support, and control means for steering said support substantially faithfully to follow said path defined by the outline, inclusive of any inside and outside corners it may contain, said control means including a photosensitive pick-up carried by said support and directed toward said outline, optical means carried by said support for sequentially displaying discrete line patterns of light which cross said outline and extend obliquely with respect to the direction of movement of said support, and circuit means actuated by said pick-up for steering said support and maintaining a predetermined balanced condition between the ends of each line pattern and the point at which they cross said outline.

18. In the system according to claim 17 wherein said optical means produces each line pattern in progressive fashion from one end to the other, said pick-up and said circuit means producing timing impulses at the beginning and end of each line pattern and an outline impulse at the instant each line pattern crosses said outline, said circuit means also including means for comparing the time interval between a timing impulse and the succeeding outline impulse, with the time interval between the outline impulse and the succeeding timing impulse, and to derive a steering signal from such difference.

19. In a system for cutting a workpiece, in combination, means forming an outline which may have inside and outside corners, a support for movement along the direction of the path generally defined by said outline, means for moving said support, and control means for steering said support substantially faithfully to follow said path defined by the outline, inclusive of any inside and outside corners it may contain, said control means including optical means for generating a line pattern of light displayed to intersect said outline, said pattern being displayed to include a portion between one end thereof and its point of intersection with said outline which progressively leads, with respect to the direction of movement of said support, said point of intersection outwardly from such point of intersection, said control means also including photosensitive pick-up means and associated circuit means for detecting shift of a point of intersection of said line pattern with said outline with respect to said one end of the line pattern from a predetermined fixed interval therebetween, and means for deriving a steering signal from such shift.

20. In a system for cutting a workpiece, in combination, means forming an outline which may have inside and outside corners, a support for movement along the direction of the path generally defined by said outline, means for moving said support, and control means for steering said support substantially faithfully to follow said path defined by the outline, inclusive of any inside and outside corners it may contain, said control means including optical means for generating successive line patterns of light displayed to intersect said outline, said control means also including photosensitive pick-up means and associated circuit means for detecting variation of the interval between one end of each line pattern and its point of outline intersection with respect to a predetermined fixed interval, and means for deriving a steering signal from such shift.

References Cited

UNITED STATES PATENTS

| | | | |
|---|---|---|---|
| 2,832,894 | 4/1958 | Eisengrein et al. | 250—202 |
| 2,945,956 | 7/1960 | Frank | 250—202 |
| 2,999,938 | 9/1961 | Hann et al. | 250—202 |
| 3,003,064 | 10/1961 | Astheimer | 250—233 |

RALPH G. NILSON, *Primary Examiner.*

T. N. GRIGSBY, *Assistant Examiner.*